Oct. 29, 1929.    E. BRANDT    1,733,858
DEVICE FOR LOCKING AT LEAST TWO NUTS
Filed Feb. 18, 1927
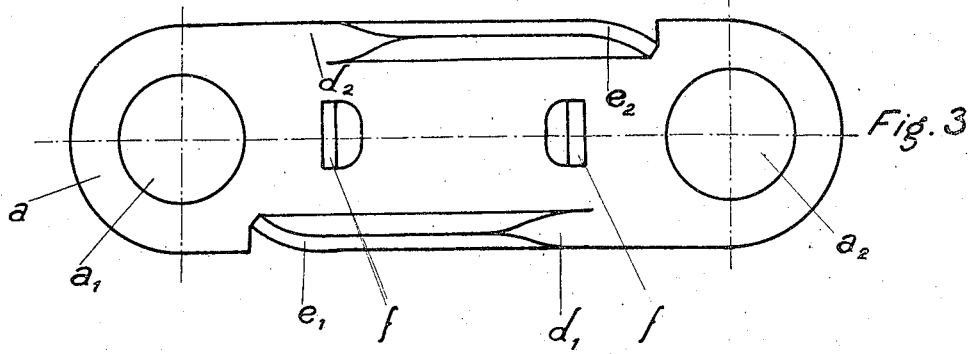
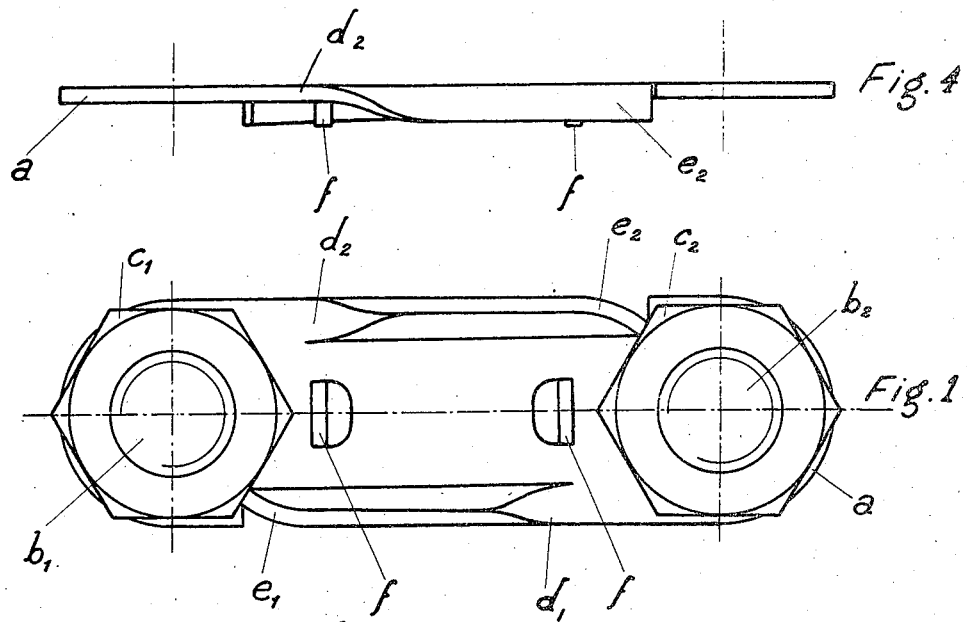
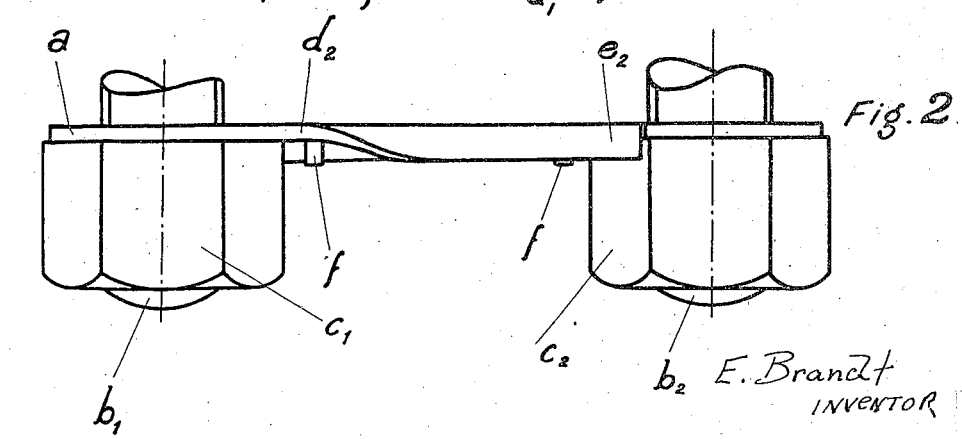
E. Brandt
INVENTOR
By: Marks & Clerk
Attys.

Patented Oct. 29, 1929

1,733,858

UNITED STATES PATENT OFFICE

EUGÈNE BRANDT, OF GENEVA, SWITZERLAND

DEVICE FOR LOCKING AT LEAST TWO NUTS

Application filed February 18, 1927, Serial No. 169,383, and in Switzerland and Great Britain September 8, 1926.

The present invention relates to a device for locking at least two nuts.

This device is adapted to be employed with advantage for locking the nuts of bolts usually employed for attaching the fish-plates to the rails of railway tracks. Although when they are placed in position these nuts are closely tightened upon the fish-plates, the vibrations caused by passing trains and the settling of the material frequently produce in time a slackening of these nuts which may become completely unscrewed and fall on to the track if they are not continually examined.

The inventor has already put forward various devices for overcoming this drawback. In certain of these devices the nuts are locked by means of a spring (blade spring or coil spring) which is placed between two consecutive nuts, the elasticity of which spring keeps it in position at the same time as it prevents the nuts from becoming slackened. But certain railway companies do not readily adopt elastic members for railway tracks for fear that the continual tension will in time reduce the elasticity of these members. Other such devices comprise two separate rigid members, one placed between the nuts and their support and the other, which may be secured in a removable manner to the first, being placed between the two nuts in such a way as to prevent them from becoming unscrewed. The security thus obtained is complete, but the manufacture of two separate parts increases the cost of the device. Further, the second member must be removed each time it is desired to tighten the nuts. Finally, certain companies have objected that a careless workman, after having placed the first of these parts between the support and the nuts, might forget to secure the second part to the first.

The object of the present invention is to remove the above mentioned drawbacks. It relates to a device for locking at least two nuts, characterized by the feature that it is formed by a plate adapted to be gripped between the two nuts and their support in which plate are cut out two tongues which are twisted so that their free ends come into contact with the nuts and act upon the latter after the manner of pawls, thus permitting the nuts to be screwed up while preventing them from being unscrewed.

The accompanying drawing illustrates by way of example a form of the object of the invention.

Figure 1 is a view in elevation, and

Figure 2 is a plan view, in which the device is placed between two nuts.

Figures 3 and 4 are a view in elevation and plan respectively of the device alone.

This form of the device according to the invention consists simply in a plate $a$, preferably made of steel and having a thickness of from 2 to 3 mm. for example. In this plate are formed two holes $a_1$ which enable it to slide upon the two consecutive bolts $b_1$, $b_2$ and be gripped between the nuts $c_1$, $c_2$ and the fish-plate. In this plate are cut two tongues $d_1$, $d_2$ which are twisted at right angles to the plate in such a way that the free ends $e_1$, $e_2$ of the said tongues are in a plane perpendicular to that of the plate $a$. Each of these ends touches one of the faces of a nut. When the latter are screwed down their edges press against the inner faces of the edges $e_1$, $e_2$ and open them out slightly in order to pass. The nuts can therefore be screwed up in the usual manner. When this operation is completed, if the nuts tend to turn in the opposite direction in order to become unscrewed their edges press upon the outer faces of the ends $e_1$, $e_2$, the effect of which is to keep the whole arrangement rigid.

To prevent the tongues $e_1$, $e_2$ from getting damaged or displaced by the wrench when the nuts are tightened, two lips $f$ are cut in the plate and bent up in a right angle to the surface of the plate, forming projections which serve as support for the wrench and protect the tongues from getting in contact with it.

The advantages of this form of construction are very numerous. First of all it only comprises one single part which is screwed between the nuts and their support and thus takes the place of the packing washers which it is usual to place in this position. Once this single member is in place, the nuts are securely held without the use of additional members. The nuts can be tightened up at any time without removing the plate. The tongues $d_1$, $d_2$ only have to act elastically when the nut is being screwed up, which operation is only infrequently carried out. Finally, the device can be employed even if, as frequently happens, the distance between the axes of the bolts varies a little; this variation will simply alter the point at which the ends $e_1$, $e_2$ touch the face of the nut.

I claim:

In a washer plate in combination with screw bolts and nuts therefor, said washer plate including a flat and rigid body portion, spring tongues cut from the body portion and turned up so that their free ends are in a plane perpendicular with the surface of the washer plate and cooperate with the nuts in the manner of pawls, and lips cut from said body portion in proximity of the nuts and turned up substantially perpendicular with the surface of the washer plate, said lips projecting slightly beyond the height of said spring tongues.

In testimony whereof I affix my signature.

EUGÈNE BRANDT.